May 17, 1938. H. KREBS 2,117,433

INTERNAL COMBUSTION ENGINE

Filed Dec. 31, 1932

Inventor
HENRY KREBS.
By Milton Tibbetts
Attorney

Patented May 17, 1938

2,117,433

UNITED STATES PATENT OFFICE 2,117,433

INTERNAL COMBUSTION ENGINE

Henry Krebs, Detroit, Mich., assignor to Packard Motor Car Company, Detroit, Mich., a corporation of Michigan Application December 31, 1932, Serial No. 649,698

12 Claims. (Cl. 123—188)

This invention relates to internal combustion engines and more particularly to valve closing mechanism.

Engine poppet valves are usually returned to and held in closed position by coil springs formed of wire and are opened by mechanisms actuated by a moving engine part, such as a cam. It is well recognized that wire springs surge during some periods of the engine speed, such periods varying in accordance with the spring characteristics and other factors. Spring surging is mainly undesirable because it causes uncertain valve timing, develops noise due to the striking together of adjacent coils and causes failure of the spring due to fatigue.

An object of this invention is to provide valve closing and seating mechanism which will operate without surging.

Another object of the invention is to provide a valve closing and seating mechanism which comprises a resilient mass.

A further object of the invention is to provide a valve closing and seating mechanism which is comprised of a coil spring and a resilient mass.

Other objects of the invention will appear from the following description taken in connection with the drawing, which forms a part of this specification, and in which.

Figures 1, 2:
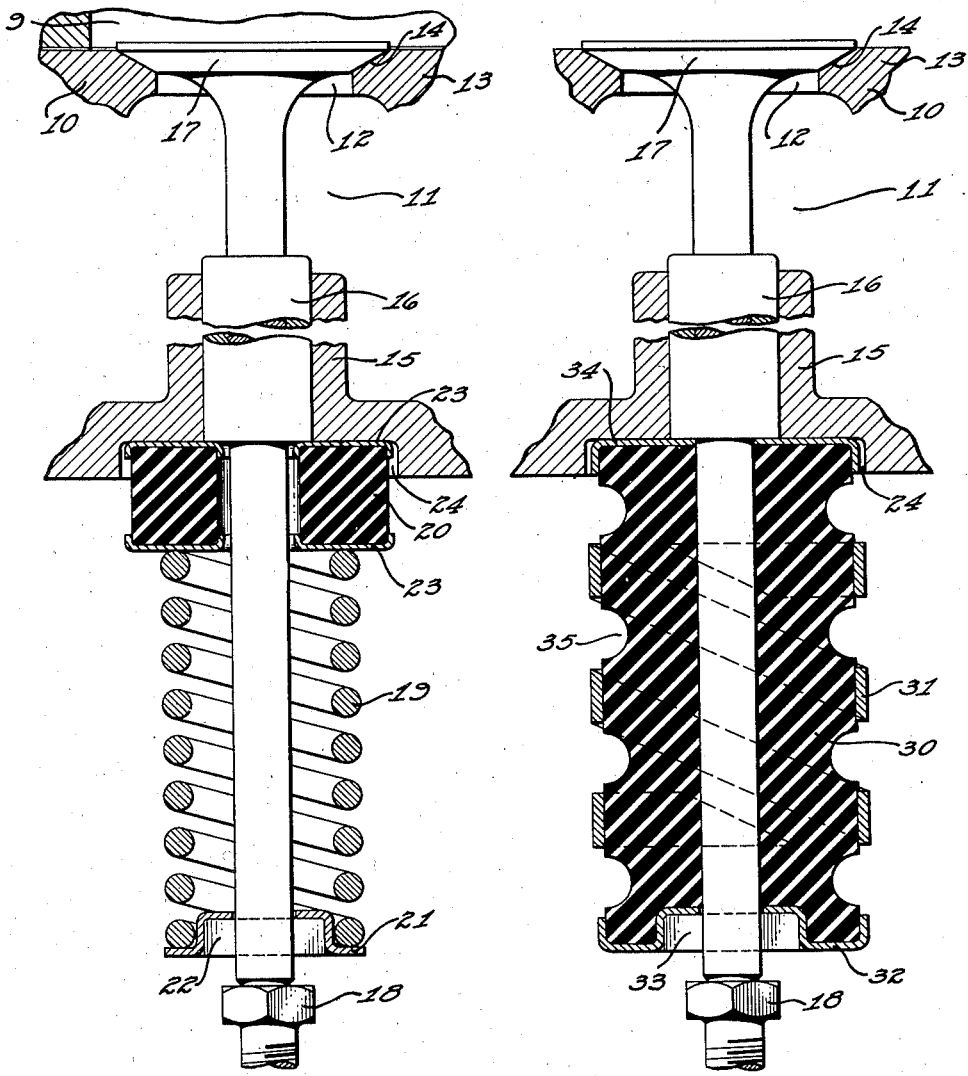
Fig. 1 is a fragmentary sectional view of an engine with which is associated a valve having closing mechanism associated therewith which forms the subject matter of this invention.
Fig. 2 is a similar view showing a modified form of valve closing mechanism.

Referring now to the drawing by characters of reference, 10 indicates a conventional form of cylinder block for an internal combustion engine of the four cycle type in which is formed a manifold, as indicated at 11, through which the fuel charges can pass into or the exhaust can pass from the explosion chamber. An opening 12 leads through the end wall 13 of the cylinder structure for establishing communication between the manifold and the combustion chamber 9 thereabove, a portion of the wall 13 being formed to provide a valve seat 14. The cylinder structure is also formed with a guide portion 15 in which is pressed a sleeve bearing 16 in which the stem of a poppet valve 17 is arranged to reciprocate. The poppet valve has the usual head portion which is arranged to engage with the seat 14 to close the opening 12.

The valve stem extends into the cylinder block and a tappet member 18, which is operated by a moving part of the engine, such as a cam (not shown), engages the projecting end thereof. The structure so far described is conventional with most four cycle internal combustion engines and a further description and showing thereof is not deemed to be necessary.

Associated with the valve stem and the cylinder block is provided mechanism for automatically returning the valve to seated position and for maintaining it in such position until the tappet mechanism again operates to open the valve, and it is the main purpose of this invention to provide a form of automatic mechanism wherein there will be no surging action during operation. As one means of carrying out this purpose, I provide mechanism which consists of a coil spring 19 and a resilient mass 20 arranged in aligned relation and surrounding the valve stem. The spring engages a retainer 21 which is held on the valve stem by a key 22 and the yieldable member 20 has a cap 23 extending over each end thereof. The under portion of the cylinder block is formed with a recess 24 into which one end of the resilient mass 20 extends and is seated and the upper end of the spring bears against the cap covering the lower face of the mass. The spring 19 is assembled so that it is compressed sufficiently to move the key and the stem downwardly to seat the head of the valve and under such circumstances the resilient mass, preferably a rubber ring, is also assembled under some compression.

When the tappet is moved upwardly to open the valve, the spring and the rubber mass are further compressed. The mass has the characteristic of cushioning the movement of the spring and, in this manner, the action of the spring is more gradual than it would be if no rubber mass were present so that any tendency to surge is substantially eliminated. Another factor in connection with this type of valve closing mechanism tending to prevent surging is the fact that, with a rubber mass forming an axial portion of the closing mechanism, a shorter length of any one type of coil spring can be used without changing the stroke of the valve or increasing the maximum spring stress.

Figure 3:
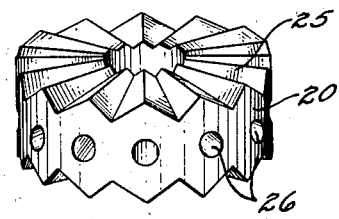
Fig. 3 is a perspective view of a modified form of rubber member which forms a part of the valve closing mechanism of the type shown in Fig. 1.

In Fig. 3, I have shown a modified form of rubber mass 20 which has a serrated upper end 25 to decrease the compression resistance. If desired, this pressure resistance can be decreased by a plurality of radially extending openings 26 formed in the rubber mass.

In Fig. 2, the automatic valve closing mechanism consists of a resilient mass 30 with which is preferably associated a coil spring 31. This rubber mass 30 engages a lower cap 32 which co-operates with a retaining key 33 extending through a slot in the lower end of the valve stem and the upper end of the yieldable mass is covered by a cap 34 which seats in the recess 24 of the cylinder block. The mass 30 is of cylindrical form and is provided with a peripheral groove 35 which spirals from one end thereof to the other. The coil spring 31 is formed preferably of flat stock and is wound spirally around the periphery of the mass intermediate the groove and is bonded thereto, under expansion, preferably along its entire length, in a suitable manner such as by vulcanizing. The valve stem extends through an opening in the cylindrical yieldable mass, which is preferably rubber, and the mass is placed under initial axial compression when it is associated in operative relation with the valve and engine. In this instance, the rubber is further compressed upon opening movement of the valve by means of the tappet, and due to its inherent characteristics will return the valve to seated position and so maintain it until the next opening actuation of the valve by the tappet. The spring serves the purpose of binding the mass to prevent undue deformation and so that the compression of said mass upon opening of the valve is resisted beyond that which would normally occur.

With the valve closing mechanism herein described there will be substantially no surging action during valve operation.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In an engine having a valve adapted to be reciprocated at a high frequency, closing means for the valve comprising a rubber member telescoping the valve stem and stationarily anchored at one end, and a coil spring telescoping the valve stem and having one end anchored axially relative thereto, said rubber member being under axial compression and co-acting with the spring to reduce the surging thereof normally occurring in high frequency operation of the valve stem.

2. In a valve mechanism for internal combustion engines, a valve, a valve stem, valve closing devices having a rubber mass surrounding a portion of the valve stem, and means for assembling the rubber mass in a compressed condition with the valve stem when the valve is closed, and in a relation opposing any valve opening movement.

3. A construction for internal combustion engines comprising a valve for rapid reciprocating movement, means for moving the valve to its closed position, comprising a spring and a mass of yielding resilient material arranged in series therewith to damp the surges of the spring.

4. In an engine, the combination with a cylinder block and a poppet valve having a stem extending through the block, of valve closing means comprising a rubber mass surrounding a valve stem and seated at one end against the block and means anchoring the other end of said rubber mass axially to the valve stem in a relation opposing opening movement of the valve, said mass co-acting with the spring to change its normal frequency when operated at high speed.

5. In an engine valve operating mechanism, valve closing means comprising a helically coiled wire section and a rubber section, said sections being arranged in series so that the rubber section dampens surging of the spring section when operated at a high rate of speed.

6. In an engine valve operating mechanism, valve closing means comprising a coil spring and a rubber mass arranged in axial abutting relation, said rubber means influencing said spring to prevent surging thereof when operated at high speed.

7. In an engine valve operating mechanism, valve closing means comprising a rubber mass, and a coil spring secured under tension around said rubber mass, said mass preventing surging of the coil spring at any operating speed.

8. In an engine valve operating mechanism, valve closing means comprising a rubber mass in compression, and a coil spring under expansion.

9. In an engine valve operating mechanism, valve closing means comprising a cylindrical rubber mass under axial compression and a helical coil, said mass being associated with said coil in a relation to reduce the normal surging thereof when operated at high speed.

10. In an internal combustion engine having an engine block provided with a passage for gas, a poppet valve movable to and from seating position to close and open said passage, and yielding means for moving said valve to seating position, said yielding means including a coil spring and other deformable means acting in series between said valve and said engine block, said deformable means being subject to deformation of less extent than said coil spring.

11. A construction for internal combustion engines comprising a valve for a rapid reciprocating movement, and means for moving the valve to seating position comprising a spring and a mass of yielding resilient material including rubber arranged in series therewith to damp the surges of the spring.

12. In an internal combustion engine having an engine block provided with a passage for gas, a poppet valve movable to and from seating position to close and open said passage, and yielding means for moving said valve to seating position, said yielding means including a coil spring and other deformable means including rubber acting in series between said valve and said engine block, said deformable means being subject to deformation of less extent than said coil spring.

HENRY KREBS.